US010065252B2

(12) United States Patent
Hoop (10) Patent No.: US 10,065,252 B2
(45) Date of Patent: Sep. 4, 2018

(54) DRILL BIT WITH A REPLACEABLE CUTTING PORTION

(71) Applicant: Hilti Aktiengesellschaft, Schaan (LI)

(72) Inventor: Matthaeus Hoop, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/106,399

(22) PCT Filed: Dec. 17, 2014

(86) PCT No.: PCT/EP2014/078140
§ 371 (c)(1),
(2) Date: Jun. 20, 2016

(87) PCT Pub. No.: WO2015/091601
PCT Pub. Date: Jun. 25, 2015

(65) Prior Publication Data
US 2017/0001249 A1      Jan. 5, 2017

(30) Foreign Application Priority Data
Dec. 20, 2013    (EP) .................................... 13198954

(51) Int. Cl.
*B23B 51/04*     (2006.01)
*B28D 1/04*      (2006.01)

(52) U.S. Cl.
CPC ...... *B23B 51/0473* (2013.01); *B23B 51/0406* (2013.01); *B23B 51/0466* (2013.01);
(Continued)

(58) Field of Classification Search
CPC ............ B23B 51/0466; B23B 51/0473; B23B 51/048; B28D 1/041; Y10T 408/895
See application file for complete search history.

(56) References Cited

U.S. PATENT DOCUMENTS

| 1,813,375 A | * | 7/1931 | Wright | ................... | E21B 10/02 |
| | | | | | 175/249 |
| 2,015,339 A | * | 9/1935 | Ellingham | .......... | B23B 51/0406 |
| | | | | | 408/199 |

(Continued)

FOREIGN PATENT DOCUMENTS

| DE | 85 12 878 U1 | 8/1985 |
| DE | 85 12 878.3 U1 | 9/1985 |

(Continued)

OTHER PUBLICATIONS

Partial English translation of Japanese Office Action issued in counterpart Japanese Application No. 2016-541279 dated Jun. 21, 2017 (four pages).

(Continued)

*Primary Examiner* — Eric A Gates
(74) *Attorney, Agent, or Firm* — Crowell & Moring LLP (57) ABSTRACT

A drill bit rotatable about a rotation axis is disclosed. The drill bit has a first drill bit portion configured as a cutting portion and has an annular portion connected at one end to one or more cutting elements and, at another end, a first connection device. The drill bit has a second drill bit portion configured as a drilling shank portion and has a cylindrical drill shaft, which on one end has a second connection device. The first and second connection devices in a connected state form a detachable connection, and a force transmission and torque transmission occur from the drill shaft portion to the cutting portion. The cutting portion has a third connection device, and the drill shaft portion has a fourth connection device. The third and fourth connection devices in a connected state form in an axial direction parallel to the axis a form-fitting connection.

12 Claims, 4 Drawing Sheets

(52) U.S. Cl.
CPC .......... *B28D 1/041* (2013.01); *B23B 2240/04* (2013.01); *B23B 2240/32* (2013.01); *B23B 2251/02* (2013.01); *B23B 2251/50* (2013.01); *B23B 2260/072* (2013.01); *Y10T 408/895* (2015.01)

(56) References Cited

U.S. PATENT DOCUMENTS

| | | | | |
|---|---|---|---|---|
| 2,326,908 | A | * | 8/1943 | Williams, Jr. .......... E21B 10/48 125/20 |
| 3,374,696 | A | * | 3/1968 | Trevathan .......... B23B 51/0406 408/204 |
| 3,382,743 | A | * | 5/1968 | Trevathan .......... B23B 51/0406 125/20 |
| 3,610,768 | A | * | 10/1971 | Cochran ............ B23B 51/0466 125/20 |
| 3,878,906 | A | * | 4/1975 | Guest ........................ E21B 7/26 175/20 |
| 3,880,546 | A | | 4/1975 | Segal |
| 3,888,320 | A | | 6/1975 | Maxwell |
| 3,999,620 | A | * | 12/1976 | Watson .............. B23B 51/0406 175/403 |
| 4,474,488 | A | * | 10/1984 | Pinkerton ............. E21B 17/046 175/414 |
| 4,500,234 | A | * | 2/1985 | Orth ...................... B23B 51/042 408/204 |
| 4,968,192 | A | * | 11/1990 | Hamilton ........... B23B 51/0466 407/33 |
| 5,007,777 | A | * | 4/1991 | Itokazu ................. B23B 51/042 408/206 |
| 5,451,128 | A | * | 9/1995 | Hattersley .......... B23B 51/0466 407/107 |
| 5,655,613 | A | | 8/1997 | Lauermann et al. |
| 5,865,571 | A | * | 2/1999 | Tankala ................ B23B 31/005 408/1 R |
| 6,007,279 | A | * | 12/1999 | Malone, Jr. ......... B23B 51/0433 144/150 |
| 7,628,228 | B2 | * | 12/2009 | Drivdahl ................. E21B 10/02 175/403 |
| 7,641,004 | B2 | * | 1/2010 | Lapointe ................ B28D 1/041 175/405.1 |
| 9,120,162 | B2 | * | 9/2015 | Keightley ........... B23B 51/0433 |
| 2004/0154837 | A1 | | 8/2004 | Gaul |
| 2005/0105981 | A1 | * | 5/2005 | Byrley ................ B23B 51/0406 408/204 |
| 2005/0260048 | A1 | | 11/2005 | Agehara et al. |
| 2006/0159531 | A1 | | 7/2006 | Bortz et al. |
| 2007/0020056 | A1 | * | 1/2007 | Burdick .............. B23B 51/0426 408/204 |
| 2007/0036620 | A1 | | 2/2007 | Keightley |
| 2010/0080665 | A1 | | 4/2010 | Keightley |
| 2013/0127123 | A1 | | 5/2013 | Miyanaga |
| 2017/0001249 | A1 | | 1/2017 | Hoop |

FOREIGN PATENT DOCUMENTS

| | | |
|---|---|---|
| DE | 196 50 718 A1 | 6/1998 |
| DE | 10 2009 010 340 A1 | 2/2009 |
| EP | 0 428 476 A1 | 5/1991 |
| EP | 2886230 A1 | 6/2015 |
| JP | 59-105311 U | 7/1984 |
| JP | 2-90006 U | 7/1990 |
| JP | 6-36805 U | 5/1994 |
| RU | 2237148 C2 | 9/2004 |
| SU | 83239 A1 | 11/1949 |
| SU | 1754346 A1 | 8/1992 |
| WO | WO 2010/097223 A1 | 2/2010 |

OTHER PUBLICATIONS

PCT/EP2014/078140, International Search Report (PCT/ISA/2010) dated Feb. 17, 2015, with partial English translation (Nine (9) pages).
European Search Report issued in European counterpart application No. 13198954.3-170 dated Jun. 3, 2014, with Statement of Relevancy (Seven (7) pages).
Chinese-language Office Action issued in counterpart Chinese Application No. 201480073735.5 dated Mar. 15, 2017 with English translation (18 pages).
Chinese-language Office Action issued in counterpart Chinese Application No. 201480073735.5 dated Feb. 8, 2018 with English translation (18 pages).
Russian-language Office Action issued in counterpart Russian Application No. 2016129498/02(045842) dated Sep. 19, 2017 (four (4) pages).
Russian-language Search Report issued in counterpart Russian Application No. 2016129498/02(045842) dated Sep. 4, 2017 with partial English translation (three (3) pages).

* cited by examiner

DRILL BIT WITH A REPLACEABLE CUTTING PORTION

This application claims the priority of International Application No. PCT/EP2014/078140, filed Dec. 17, 2014, and European Patent Document No. 13198954.3, filed Dec. 20, 2013, the disclosures of which are expressly incorporated by reference herein.

BACKGROUND AND SUMMARY OF THE INVENTION

The invention relates to a drill with an exchangeable cutting portion.

The term "drill bit" encompasses all drill tools that have a hollow, cylindrical drill shaft having one or more cutting elements, for example, core drill bits and dry socket drill bits. Depending on their intended use, the drill bits may have additional elements, such as a depth stop that limits the bore depth.

Drill bits consist of a cutting portion with one or more cutting elements, a drill shaft portion, and a receiving portion with an insertion end. The drill bit is attached via the insertion end in the tool holder of a drill device and driven, in the drilling mode, by a drill device about a rotational axis and moved along a drilling direction that runs parallel to the rotational axis into a substrate to be worked on. Drill bits can be subdivided into drill bits with an exchangeable drill bit portion and drill bits without an exchangeable drill bit portion. Accordingly, the term "drill bit portion" encompasses the individual portions of the drill bit that may be designed as a cutting portion, drill shaft portion, or receiving portion.

From the prior art, one knows of various drill bits with an exchangeable drill bit portion, wherein the cutting portion, the receiving portion, or the cutting and receiving portion may be designed in an exchangeable manner. For drill bits with an exchangeable drill bit portion, the connection between the drill bit portions must transmit forces and torques occurring in drilling operations. Besides the force and torque transmission, the connection must withstand the tensile load occurring when removing the drill bit from the substrate, wherein the tensile load is particularly high when the drill bit has gotten jammed in the substrate. The property of withstanding the tensile load is also referred to as removal protection.

For drill bits with an exchangeable drill bit portion, the connection between the drill bit portions may be designed as a detachable or non-detachable connection. In a detachable connection, the connection may be removed in a non-destructive manner, whereas the connection of a non-detachable connection can only be removed by destroying the connection. Examples of detachable connections are plug connections, screw connections, or magnetic connections. Examples of non-detachable connections are solder connections, weld connections, rivet connections, or adhesive connections.

Non-detachable connections are suited in particular for drill bits, in which a worn cutting portion is to be exchanged, whereas when it comes to more frequent exchanges of the drill bit portion, detachable connections have advantages over non-detachable connections. When a drill bit is to be connected to various drilling devices, the insertion end must be matched to the tool holder of the drilling device. Suited for such applications are detachable connections that the operator can open and close at the job site.

In a detachable connection between the drill bit portions, an unintended detaching of a drill bit portion can occur, particularly when the drill bit seizes while drilling into the substrate. In core drilling, a regular occurrence is that the drill bit seizes while drilling into the substrate and must be disengaged by the operator. For disengaging the jammed drill bit, the drill bit of stand-mounted core drilling devices is driven the opposite direction of rotation and a tensile force, directed opposite the drilling direction, is exerted by the drill stand on the drill bit. The operator attempts to release the drill bit from the substrate by a manual rotation using a tool key and simultaneous pulling by means of the drill stand.

EP 0 428 476 A1 discloses a drill bit with an exchangeable cutting portion, which is connected via a combined plug and solder connection to the drill shaft portion. The cutting portion has an external plug element and the drill shaft portion has a complementarily formed inner plug element, which are plugged into each other and are soldered together. The inner plug element is 2% to 10% longer than the outer plug element and contacts with an end surface a contact surface of the outer plug element. Between the interconnected plug elements, there is a gap that is filled with a solder. By heating the plug elements, the solder melts, and a solder connection is formed between the plug elements. The force transmission of the drill shaft portion on the cutting portion occurs via the end and contact surfaces of the plug elements and the torque transmission occurs via the solder connection.

Drill bits with a solder connection have the disadvantage that a solder device and solder expertise are required to destroy the solder connection and to create a new solder connection. Therefore, these drill bits are not suited for a rapid exchange of the cutting portion at the job site. Besides, there is the danger that the connections of the cutting elements, which are often soldered or welded, are negatively affected by the heating of the plug elements when soldering the cutting portion. To ensure that the heat-affected region does not include the cutting elements when soldering the plug elements, the cutting portion must have a corresponding height, wherein the additional material means higher costs and weight.

DE 196 50 718 A1 discloses a drill bit, in which an exchangeable cutting portion is connected to the drill shaft portion via an adhesive connection. The cutting portion and the drill shaft portion have complementarily designed plug elements, which are plugged into one another. Between the contact surfaces of the plug elements, an adhesive is applied that connects the two drill bit portions together in a material-bonded manner. The adhesive connection must be designed in such a manner that the glued contact surfaces can transmit the required torque and also withstand the tensile load when removing a jammed drill bit. The disassembly of a worn cutting portion occurs by heating the adhesive connection to approx. 300 degrees Celsius (deg. C.), whereby the adhesive is destroyed. The adhesive connection is suited only for drill applications in which the occurring temperatures lie well below 300 deg. C. When dry-drilling very hard materials, e.g., marble, the drill bit can heat up intensely, whereby the adhesive connection can be destroyed or at least impaired. Another disadvantage is that to create a new adhesive connection, special materials and tools as well as adhesion expertise are required. Only if the adhesive connection was properly created, can the glued contact surfaces transmit the required torque and withstand the tensile load when removing a jammed drill bit.

DE 10 2009 010 340 A1 discloses another drill bit with an exchangeable cutting portion, which is connected to the drill shaft portion via a nondetachable connection. On the drill shaft and cutting portions, there are provided form-fitting profiles that are designed complementarily and can engage into each other. The force and torque transmissions from the drill shaft portion to the cutting portion occur via the form-fitting profiles. Removal prevention is achieved by means of multiple material-bonded connection points or connection regions.

DE 85 12 878 U1 discloses a drill bit with an exchangeable receiver portion that is connected to the drill shaft portion via a bayonet connection. On the drill shaft portion, there are provided two slit-shaped recesses in the form of an L into which two pin elements, arranged on the receiver portion, are inserted. The slit-shaped recesses are angled in the end region and have a slight incline so that the pin elements can clamp themselves on in the end regions. To open the bayonet connection, manual force is sufficient. The force and torque transmission from the receiver portion to the drill shaft portion occurs via the pin elements.

The requirements in terms of force transmission and torque transmission between two drill bit portions are independent of the position of the detachable connection. The problem of unintended detaching of a drill bit portion occurs only in exchangeable cutting portions since the detachable connection is located in the substrate when drilling and is not visible to the operator. If, on the known drill bit having an exchangeable receiver portion, the bayonet connection has detached, the receiver portion can be connected at any time to the drill shaft portion while being visibly monitored.

U.S. Pat. No. 3,888,320 A discloses a drill bit with an exchangeable cutting portion, which is connected via a detachable plug-and-twist connection to the drill shaft portion. The cutting portion includes an annular portion, which is connected on a first end to a plurality of cutting elements and has, on a second end, an external plug element and an annular limit stop shoulder. The drill shaft portion includes a cylinder-shaped drill shaft, which has, on an end facing the cutting portion, an inner plug element with an end face. The plug elements form a plug connection in a plug direction parallel to the axis of rotation. The outer plug element has on the inner side multiple pin elements, which are oriented radially inward in a plane vertical to the axis of rotation. The inner plug element has, on the outer, side multiple slit-shaped recesses in an L-shape into which the pin elements are inserted. The torque transmission from the drill shaft portion to the cutting portion occurs via the pin elements. The L-shaped recesses consist of a transverse slit that runs perpendicular to the axis of rotation, and a connecting slit that runs parallel to the axis of rotation and connects the transverse slit to a bottom edge of the inner plug element. The inner plug element with the end face and the slit-shaped recesses form a first connection device. The outer plug element with the limit stop shoulder and the pin elements form a second connection device. In a connected state, the first and second connection devices form the detachable plug-and-twist connection between the cutting portion and the drill shaft portion, and by means of the first and second connection devices, force and torque transmission takes place on the cutting portion.

The drill shaft portion is surrounded by a return spring that is clamped in between the receiver portion and the cutting portion. If a force acts on the drill shaft portion in the drilling direction, the return spring is compressed and the drill shaft portion is moved in the drilling direction until the end face of the drill shaft portion abuts the limit stop shoulder of the cutting portion. In a no-load state, i.e., without any force acting in the drilling direction, there is an axial gap between the cutting portion and the drill shaft portion. For removal prevention, which is intended to prevent an unintentional detaching of the cutting portion, the transverse slit has an undercut that accommodates the pin element in a no-load state. The removal prevention property and reliably prevents the cutting portion from detaching when removing the drill bit from the substrate. However, problems do occur when the drill bit has jammed in the substrate and must be disengaged by the operator. When the operator exerts a force on the drill shaft portion and the drill shaft portion moves opposite the direction of rotation, the pin element can be moved out of the undercut. As soon as the pin element has left the undercut and is positioned in the transverse slit, the return spring assists in disengaging the plug-and-twist connection.

The object of the invention consists of developing a drill bit with an exchangeable cutting portion in which the risk is reduced that the detachable connection between the drill shaft portion and the cutting portion unintentionally opens when removing a jammed drill bit from the substrate, and the drill shaft portion is removed from the substrate without the cutting portion.

According to the invention, it is disclosed that the cutting portion has a third connection device different from the first connection device, and that the drill shaft portion has a fourth connection device different from the second connection device, wherein the third and fourth connection devices in a connected state form a form-fitting connection in an axial direction parallel to the axis of rotation between the cutting portion and the drill shaft portion.

An axial direction is defined as a direction parallel to the axis of rotation of the drill bit. In the connected state of the drill bit portions, the axis of rotation of the drill bit coincides with the longitudinal axes of the drill bit portions, cutting portion, and drill shaft. A radial plane is defined as a plane perpendicular to the axis of rotation and a radial direction is a direction that runs in the radial plane and cuts the axis of rotation or the longitudinal axis of the drill bit portion.

The first and second connection devices form in a connected state a detachable connection between the cutting portion and the drill shaft portion, wherein the force transmission and torque transmission from the drill shaft portion to the cutting portion occur by way of the first and second connection devices. The idea of the invention consists of realizing, by way of the third and fourth connection devices, a removal prevention property which impedes an unintended removal of the drill shaft portion from the cutting portion when a drill bit is jammed. By the fact that the third and fourth connection devices differ from the first and second connection devices, the risk of an unintended detaching can be further reduced.

In a preferred embodiment, the third and fourth connection devices have a tongue and a groove, wherein the tongue can be moved into the groove. The design of the third and fourth connection devices as tongue and groove allows a simple and reliable connection that impedes removal of the drill shaft portion from the cutting portion. The retaining force of the connection can be adapted to the application field of the drill bit by way of the tongue and groove geometry.

Preferably, the first and second drill bit portions include an inner plug element and an outer plug element, wherein the inner and outer plug elements form in a connected state a plug connection. In doing so, the drill bit portions are form-fittingly connected in all directions perpendicular to the axis of rotation by way of plug elements. A plug element refers to a connection in which two plug elements are moved along a plug direction and from a form-fitting connection in at least one direction. A plug connection with an inner plug element and an outer plug element can be easily opened and closed by a user. In addition, the drill bit portions that are connected via the plug elements can be oriented to each other.

In a preferred embodiment, an end face of the inner plug element in a connected state abuts a limit stop shoulder of the outer plug element. The force transmission of the drill shaft portion on the cutting portion occurs during drilling via the end face and the limit stop shoulder. The risk of deforming the outer plug element is reduced when the force transmission does not occur via pin elements, so that the drill bit, according to the invention, has a greater stability. The limit stop shoulder may be designed in a ring-shaped or annular section-shaped manner. By way of the end face lying flat on a ring-shaped limit stop shoulder, the drill bit is designed in a leak-tight manner on the inner side so that the misrouting of a cooling or flushing medium is prevented. The cooling or flushing medium supplied for example via the insertion end of the drill bit flows entirely to the location being worked on and ensures the cutting elements are cooled and the cuttings carried away.

In a particularly preferred manner, the outer plug element is provided on the cutting portion and the inner plug element is provided on the drill shaft portion. The outer plug element becomes worn on the outer side by the substrate. Therefore, it is advantageous to arrange the plug element more subjected to high loads on an exchangeable cutting portion.

In a preferred embodiment, the first and second connecting devices have at least one pin element and at least one slit-shaped recess, wherein the pin element can be moved into the slit-shaped recess. In a connected state of the drill bit portions, a torque transmission from the drill shaft portion to the cutting portion results by way of the pin element and the slit-shaped recess.

It is preferred that at least one pin element is arranged on an outer side of the inner plug element and the outer plug element has at least one slit-shaped recess. The drill bit portion, which has the slit-shaped recess, is more prone to deformation due to tensile loads than the drill bit portion on which the pin elements are arranged. Since the diameter of the outer plug element is greater than the diameter of the inner plug element, there is on the outer plug element more circumference available for the slit-shaped recesses, or the amount of slit-shaped recesses on the circumference is less. The drill bit is more stable when the slit-shaped recesses are provided on the outer plug element. In addition, removal prevention achieved by way of tongue and groove can be disengaged more easily due to the operator's accessibility by way of a commercially available tool, if the slit-shaped recesses are provided on the outer plug element. The arrangement of the slit-shaped recesses in the inner plug element require a special tool for disengagement and the accessibility on the inner side is limited if the drill bit has been jammed in.

At least one slit-shaped recess penetrates entirely through the outer plug element in a radial direction. Regarding the drill bit according to the invention, the third and fourth connection devices have the tongue and groove, wherein the form-fitting connection in a connected state impedes removal of the drill shaft portion from the cutting portion. So that the connection between the tongue and groove can be detached by the operator, the outer plug element is subdivided by the slit-shaped recesses into multiple portions that are designed in a springy manner. This spring effect is necessary to disengage the form-fitting connection and to move the tongue out of the groove.

In a preferred embodiment of the drill bit, three or more pin elements are arranged on the outer side of the inner plug element and the outer plug element has three or more slit-shaped recesses, wherein the number of the recesses is greater than or equal to the number of pin elements. Regarding the drill bit according to the invention, the torque transmission occurs via the pin elements to the outer plug element. In doing so and in a particularly preferred manner, the pin elements are distributed evenly about the axis of rotation of the drill bit. By the even distribution of the pin elements, there is no allocation between the pin elements and the slit-shaped recesses and a pin element can be inserted into any slit-shaped recess. So that the portions of the outer plug element, which are created between the slit-shaped recesses, have a sufficient spring effect to open the form-fitting connection, at least three slit-shaped recesses are required.

Preferably, the tongue is arranged on the outer side of the inner plug element and the outer plug element has the groove. By arranging the groove in the outer plug element, the spring effect can be increased. This design has the advantage that the tongue, which can act as a stiffening element, is arranged on the inner plug element and improves the stability of the inner plug element.

In a particularly preferred manner, the groove is arranged in an axial direction, i.e., in a direction parallel to the longitudinal axis of the drill shaft and parallel to the axis of rotation of the drill bit, between the pin elements and the drill shaft, and the groove is arranged in an axial direction at the level of the slit-shaped recesses. To separate the drill shaft portion from the cutting portion, a force is exerted in an axial direction on the end face of the outer plug element by way of a tool. By the force application, the springy portion of the outer plug element is deflected and the form-fitting connection between the tongue and groove can be disengaged. The greater the distance of the groove is to the limit stop shoulder of the outer plug element, the greater the deflection of the springy portion.

In a particularly preferred manner, the groove is designed in a ring-shape and arranged in a plane perpendicular to the axis of rotation of the drill bit. A groove with a ring-shaped design, which is arranged at the level of the slit-shaped recesses, supports the spring effect of the portions of the outer plug element between the slit-shaped recesses.

Preferably, the axial height of the groove is at least 1 millimeter (mm) larger than the axial height of the tongue. The difference between the axial heights of the groove and tongue is selected to be greater than would be necessary for tolerance reasons. The difference of the axial heights can be used to shift the drill bit portions in relation to each other for disengaging the form-fitting connection, so that the operator can affix a tool on the outer plug element.

Embodiments of the invention are described below by way of the drawing. It is not necessarily meant to depict the embodiments to scale, but rather, the drawing, where useful for explanation purposes, is made in a schematic and/or slightly distorted manner. In regard to supplements of the teachings that are readily apparent from the drawing, one shall refer to the relevant prior art. In doing so, one shall take into account that diverse modifications and changes regarding the shape and detail of an embodiment can be undertaken without de-parting from the general idea of the invention. The features of the invention disclosed in the description and the drawing may be essential both individually per se and in any combination for enhancements. Also falling within the realm of the invention are all combinations of at least two features disclosed in the description and/or drawing. The general idea of the invention is not limited to the exact form or the detail of the preferred embodiment shown and described hereafter. For given measurement ranges, values lying within the mentioned limits shall be disclosed as limit values and can be used for any application. For the sake of simplicity, the same reference signs are used hereafter for identical or similar parts or parts with identical or similar functions.

DETAILED DESCRIPTION OF THE DRAWINGS

Figure 1A:
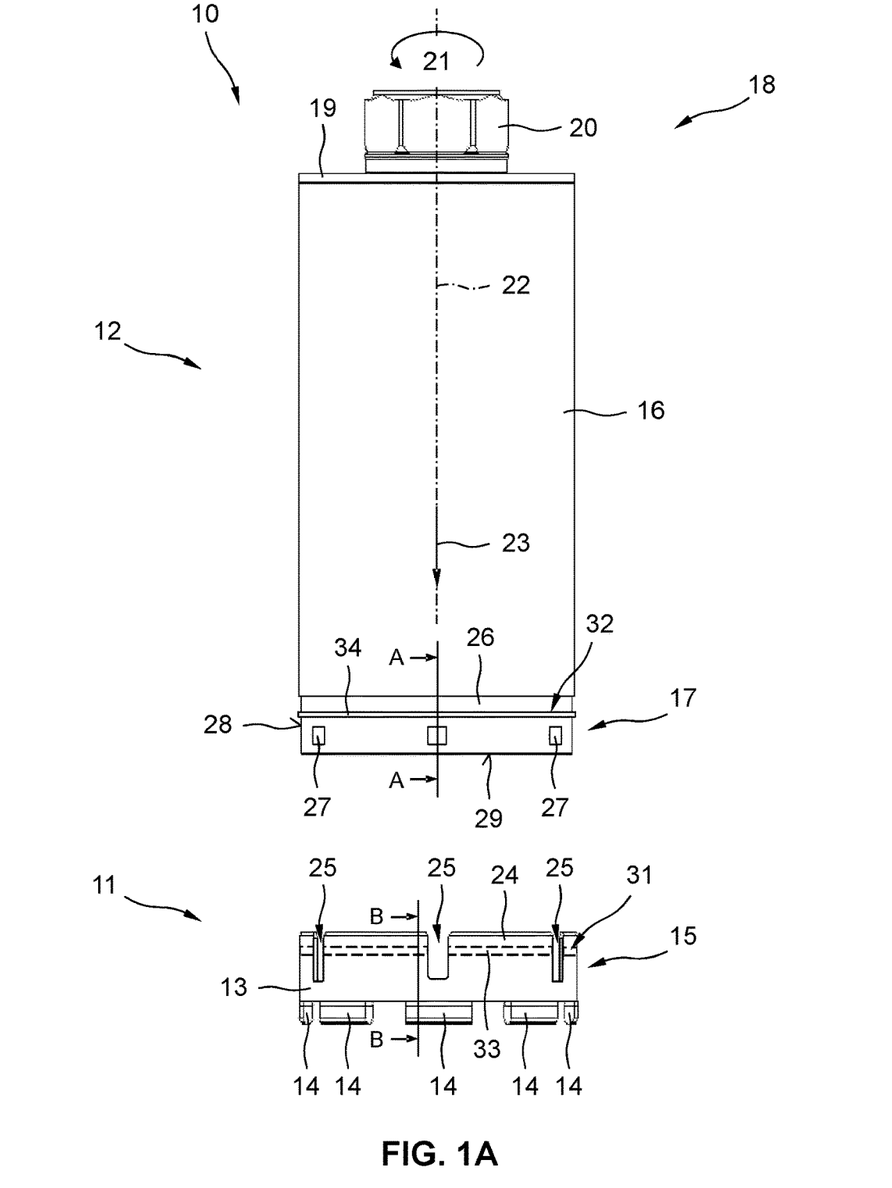
FIGS. 1A, B depict a drill bit according to the invention with an exchangeable cutting portion and a drill shaft portion in a non-connected state (FIG. 1A) and in a connected state (FIG. 1B)
Figure 1B:
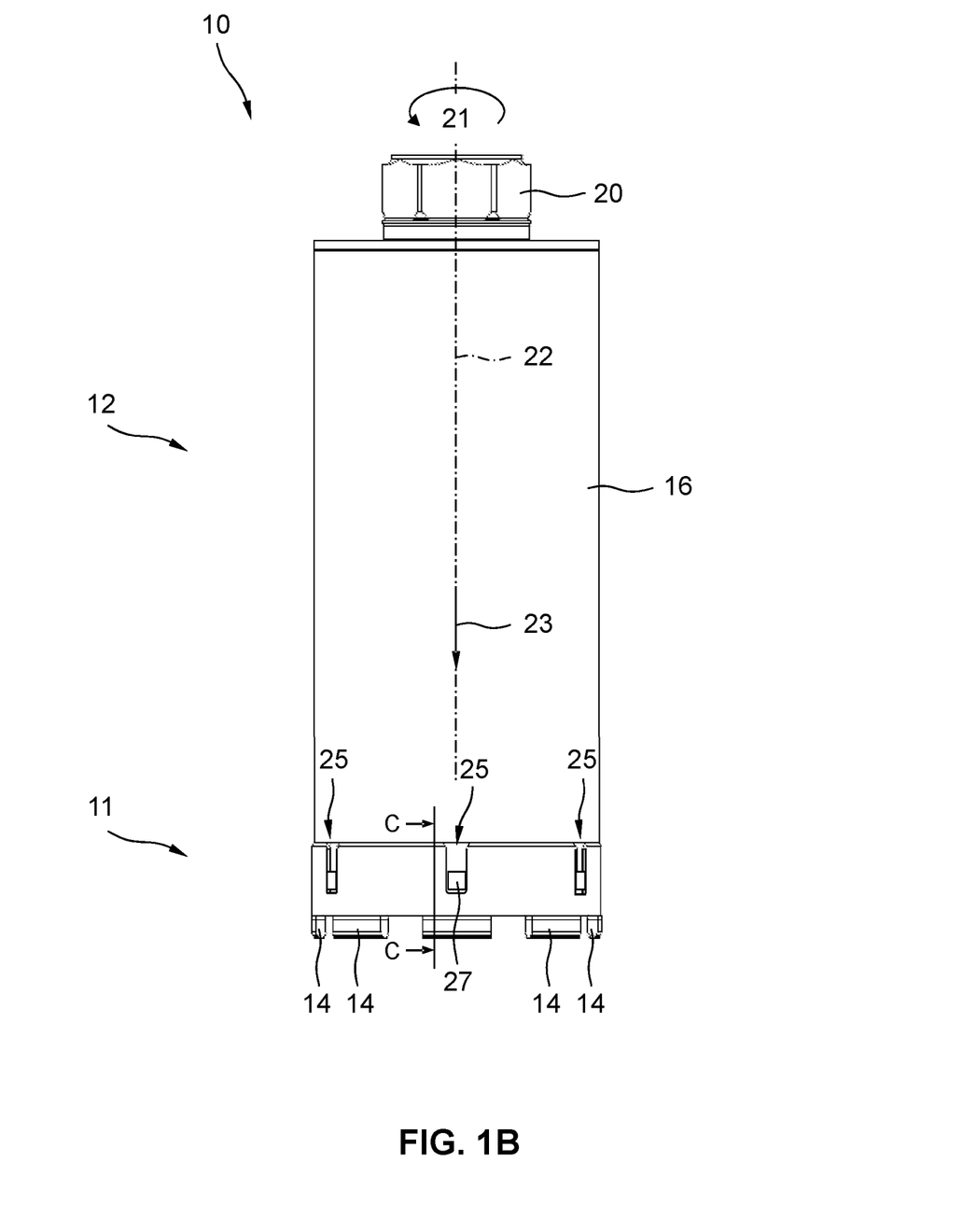

FIGS. 1A, B depict a drill bit 10 according to the invention with a cutting portion 11, which is connected via a detachable connection to a drill shaft portion 12. In doing so, FIG. 1A depicts cutting portion 11 and drill shaft portion 12 in a non-connected state with an open connection, and FIG. 1B depicts cutting portion 11 and drill shaft portion 12 in a connected stated with a closed connection.

Cutting portion 11 includes an annular portion 13, which is connected at one end facing away from drill shaft portion 12 to multiple cutting elements 14, and which has on an end facing drill shaft portion 12 a first connection device 15. Cutting elements 14 are welded, soldered, or screwed to annular portion 13, or attached by way of another suited attachment method to annular portion 13. Cutting portion 11 can have, instead of multiple cutting elements 14, also a single cutting element designed as a cutting sleeve, which is connected to annular portion 13.

Drill shaft portion 12 includes a cylindrical drill shaft 16, which has, on an end facing cutting portion 11, a second connection device 17, and which, on an end facing away from cutting portion 11, is connected to a receiving portion 18. Receiving portion 18 includes a cover 19 and an insertion end 20. Drill bit 10 is attached via insertion end 20 in the tool holder of a drilling device. During the drilling operation, drill bit 10 is driven in direction of rotation 21 about an axis of rotation 22 and moved in a drilling direction 23 parallel to axis of rotation 22 into the substrate to be worked on. Axis of rotation 22 runs coaxially to a longitudinal axis of drill shaft 16 and to a longitudinal axis of annular portion 13. Drill bit 10 has a circular cross-section perpendicular to axis of rotation 22. Alternatively, drill bits according to the invention may have other suitable cross-sections, such as a polygonal cross-section.

The first connection device 15 includes a first plug element 24, which is designed as an outer plug element, and six slit-shaped recesses 25, which are provided in the outer plug element. Second connection device 17 includes a second plug element 26, which is designed as an inner plug element, and six pin elements 27, which are attached on an outer side 28 of inner plug element 26 and are oriented radially outward.

In the connected state depicted in FIG. 1B, the first and second connection devices 15, 17 form a detachable connection between cutting portion 11 and drill shaft portion 12. By way of first and second connection devices 15, 17, the force transmission and torque transmission occur from drill shaft portion 12 to cutting portion 11.

Pin elements 27 and slit-shaped recesses 25 are arranged evenly about axis of rotation 22. By the even distribution, there is no allocation between pin elements 27 and slit-shaped recesses 25, and a pin element 27 can be inserted into any slit-shaped recess 25. Slit-shaped recesses 25 consist of a longitudinal slit, whose longitudinal axis is arranged parallel to axis of rotation 22. This shape of the slit-shaped recess is also referred to as an I-slit. In the depicted embodiment, pin elements 27 are designed in a rectangular manner. Alternatively, pin elements 27 can be circular, trapezoidal, or be designed in another suitable cross-sectional shape. Slit-shaped recesses 25 can alternatively be designed as L- or T-slits.

To support the force and torque transmission and to prevent individual regions from being overloaded, the contact region, through which the force and torque transmission from drill shaft portion 12 to cutting portion 11 occur, should not be point-shaped or line-shaped, but surface-shaped. The contact region can be adjusted by the cross-sectional shape of pin elements 27. In any event, the torque transmission occurs via pin elements 27, which strike a side-wall of I-slit 25 when drill shaft portion 12 is rotated. The force transmission can also occur via pin elements 27 or via a limit stop shoulder, which is struck by an end face 29 of inner plug element 26.

Cutting portion 11 has, besides first connection device 15, a third connection device 31, which is different from first connection device 15, and drill shaft portion 12 has, besides second connection device 17, a fourth connection device 32, which differs from second connection device 17. In a connected state of drill bit 10, third and fourth connection devices 31, 32 form in an axial direction a form-fitting connection between cutting portion 11 and drill shaft portion 12. Cutting portion 11 is protected against a removal of drill shaft portion 12 from cutting portion 11 by way of third and fourth connection devices 31, 32.

Third connection device 31 includes a groove 33, which is arranged on an inner side of outer plug element 24. Fourth connection device 32 includes a tongue 34, which is arranged on outer side 28 of inner plug element 26 and extends radially outward.

Cutting portion 11 can be connected to drill shaft portion 12 by the operator simply and quickly. To do so, cutting portion 11 with outer plug element 24 is placed on inner plug element 26 of drill shaft portion 12 in such a manner that pin elements 27 are arranged in slit-shaped recesses 25. Cutting portion 11 is moved in an axial direction until tongue 34 is latched into groove 33.

Figures 2, 3:
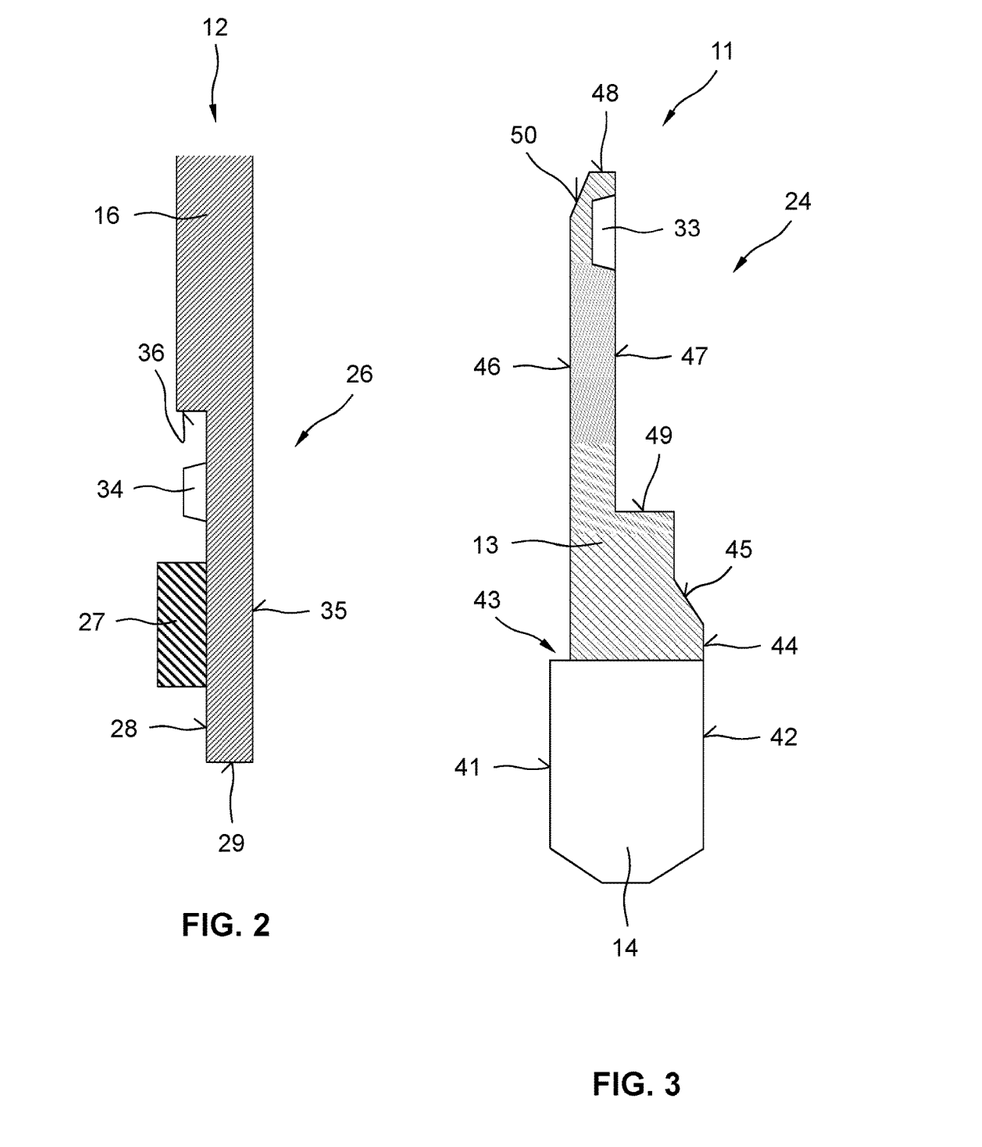
FIG. 2 depicts the drill shaft portion of the drill bit depicted in FIG. 1 in a longitudinal cross-section along sectional plane A-A in FIG. 1A.
FIG. 3 depicts the cutting portion of the drill bit depicted in FIG. 1 in a longitudinal cross-section along the sectional plane B-B in FIG. 1A (FIG. 3A)

FIG. 2 depicts a section of drill shaft portion 12 of drill bit 10 according to the invention in a longitudinal cross-section along sectional plane A-A in FIG. 1A. Drill shaft portion 12 includes cylindrical drill shaft 16 and inner plug element 26, which are constructed in a monolithic manner. As an alternative to the monolithic design, inner plug element 26 may be constructed as a separate component and then be connected to drill shaft 16.

Inner plug element 26 includes an outer shell surface, which corresponds to outer side 28, the end surface 29, and an inner shell surface 35, on the transition from drill shaft 16 to inner plug element 26 there is a ring-shaped limit stop shoulder 36. On outer side 28 of inner plug element 26, there are arranged pin elements 27 and tongue 34. Pin elements 27, tongue 34, and inner plug element 26 may be produced of various materials and connected to each other or they consist of the same material, wherein pin elements 27 and tongue 34 may be created by forming processes, such as stamping or pressing.

Tongue 34 is arranged in an axial direction, i.e., in drilling direction 23, between pin elements 27 and limit stop shoulder 36 of inner plug element 26. To separate drill shaft portion 12 from cutting portion 11, a force is exerted in an axial direction on the end face of outer plug element 24 by way of a tool. By the application of force, the springy portion of outer plug element 24 is deflected and the form-fitting connection between tongue 34 and groove 33 can be disengaged. The greater the distance of groove 33 is to end face 29 of inner plug element 26, the greater the deflection of outer plug element 24.

FIG. 3 depicts cutting portion 11 of drill bit 10 according to the invention in a longitudinal cross-section along sectional plane B-B in FIG. 1A. Cutting portion 11 includes annular portion 13, cutting elements 14, and outer plug element 24. In the depicted embodiment, annular portion 13 and outer plug element 24 are constructed in a monolithic manner. As an alternative to the monolithic design, outer plug element 24 can be constructed as a separate component and then be connected to annular portion 13.

Cutting elements 14 are arranged in a plane perpendicular to axis of rotation 22 in a ring shaped manner about annular portion 13 and each have an outer edge 41 and an inner edge 42. Annular portion 13 connects in a bonded manner to inner edge 42 of cutting element 14 and has, relative to outer edge 41 of cutting element 14, a setback 43. Outer edges 41 of cutting elements 14 form an outer circle with an exterior diameter and the inner edges form an inner circle with an interior diameter. Cutting elements 14 create, in the substrate, a drill hole with a drill hole diameter which corresponds to the exterior diameter of cutting elements 14. Inside drill bit 10, a drill core is created with a drill core diameter, which corresponds to the interior diameter of the cutting elements.

Annular portion 13 includes on the inner side a guide portion 44 and a core removal portion 45. Core removal portion 45 has an inclined surface that assists the removal of the drill core. Guide portion 44 connects in a bonded manner to cutting element 14 and forms a guide for cutting elements 14 when drilling. As an alternative to the guide on the inner side of drill bit 10, the guide portion can be arranged on the outer side or on the outer and inner sides.

Outer plug element 24 includes an outer shell surface 46, an inner shell surface 47, and an end face 48. At the transition from annular portion 13 to outer plug element 24, there is a ring-shaped limit stop shoulder 49. Outer plug element 24 also has an inclined outer surface 50, whose diameter increases in the direction of cutting elements 14.

Groove 33 is arranged on the inner shell surface 47 of outer plug element 24. By the arrangement of groove 33 in outer plug element 24, the spring effect of outer plug element 24 can be increased. Groove 33 is designed in a ring-shaped manner and arranged in a plane perpendicular to axis of rotation 22 of drill bit 10. An annular designed groove, which is arranged in the axial direction at the level of slit-shaped recesses 25, supports the spring effect of the portions of the outer plug element 24 between slit-shaped recesses 25.

Figure 4:
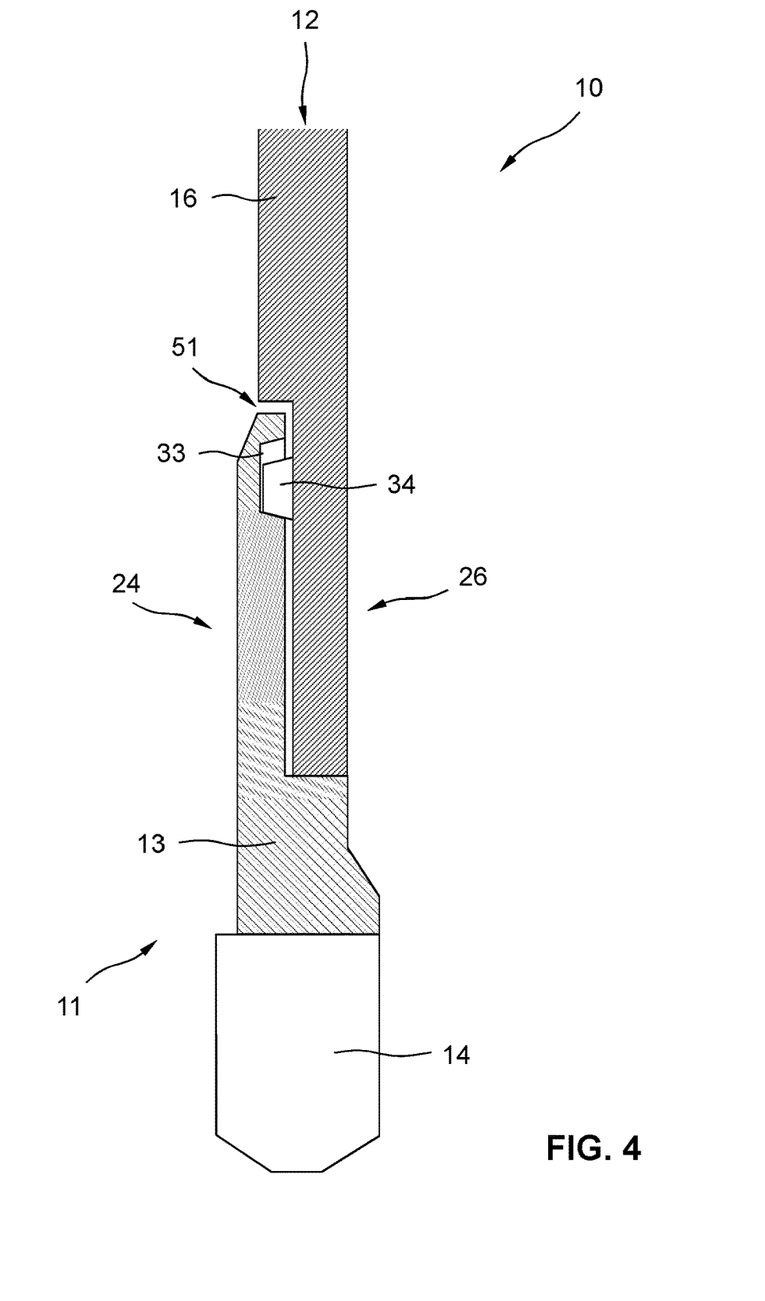
FIG. 4 depicts the cutting portion and the drill shaft portion in a connected stated in a longitudinal cross-section along sectional plane C-C in FIG. 1B.

FIG. 4 depicts drill bit 10 according to the invention with cutting portion 11 and drill shaft portion 12, which are connected via the detachable connection, in a longitudinal cross-section along sectional plane C-C in FIG. 1B.

In a connected state, drill shaft portion 12 abuts limit stop shoulder 49 of cutting portion 11 with end face 29. The length of inner plug element 26 is greater than the length of outer plug element 24, so that an axial gap 51 is formed between end face 48 of outer plug element 24 and limit stop shoulder 32 of inner plug element 26. Due to the length difference between inner plug element 26 and outer plug element 24, one can ensure that end face 29 of inner plug element 26 abuts limit stop shoulder 49 of outer plug element 24 and that a defined force transmission occurs from drill shaft portion 12 to cutting portion 11 when drilling.

The retention force that tongue 34 and groove 33 withstand can be adjusted via the geometry of tongue 34 and groove 33. The latching-in of tongue 34 and groove 33 is to be as convenient for the operator as possible. An inclined surface simplifies the latching-in. Suited as geometric parameters for adjusting the retention force are, for example, the radial height of tongue 34, i.e., the height in a radial direction, the contact surface between tongue 34 and the inner plug element, and the inclination angle.

The axial height of groove 33, i.e., the height of groove 33 in an axial direction, is at least 1 mm greater than the axial height of tongue 34. The difference between the axial heights of groove 33 and tongue 34 is selected to be larger than would be necessary for tolerance reasons. The difference of the axial heights can be used to shift drill bit portions 11, 12 in relation to each other to disengage the form-fitting connection so that the operator can enlarge axial gap 51 and apply a tool in axial gap 51.

The invention claimed is:

1. A drill bit, wherein the drill bit is rotatable about an axis of rotation, comprising:
   a first drill bit portion configured as a cutting portion, having an annular portion that is connected at one end to one or more cutting elements and, at another end, a first connection device; and
   a second drill bit portion configured as a drill shaft portion, having a cylindrical drill shaft, which on one end facing the cutting portion has a second connection device,
   wherein the first and second connection devices in a connected state form a detachable connection between the cutting portion and the drill shaft portion, and via the first and second connection devices, a force transmission and torque transmission occur from the drill shaft portion to the cutting portion,
   wherein the first connection device comprises an outer plug element and at least one slit-shaped recess and the second connection device comprises an inner plug element and at least one pin element, the at least one pin element being moveable into the at least one slit-shaped recess, wherein the inner and outer plug elements form a plug connection in the connected state,
   wherein the cutting portion has a third connection device different from the first connection device, and the drill shaft portion has a fourth connection device different from the second connection device, and
   wherein the third and fourth connection devices in a connected state form in an axial direction parallel to the axis of rotation a form-fitting connection between the cutting portion and the drill shaft portion.

2. The drill bit according to claim 1, wherein the third and fourth connection devices have a tongue and a groove, and the tongue is moveable in the groove.

3. The drill bit according to claim 2, wherein the axial height of the groove is at least 1 mm larger than the axial height of the tongue.

4. The drill bit according to claim 1, wherein an end face of the inner plug element abuts a limit stop shoulder of the outer plug element when in the connected state.

5. The drill bit according to claim 4, wherein the outer plug element is provided on the cutting portion and the inner plug element is provided on the drill shaft portion.

6. The drill bit according to claim 1, wherein the outer plug element is provided on the cutting portion and the inner plug element is provided on the drill shaft portion.

7. The drill bit according to claim 1, further comprising at least one pin element arranged on an outer side of the inner plug element, and the outer plug element has the at least one slit-shaped recess.

8. The drill bit according to claim 7, wherein the at least one slit-shaped recess completely penetrates the outer plug element in a radial direction perpendicular to the axis of rotation.

9. The drill bit according to claim 8, wherein a tongue is arranged on the outer side of the inner plug element, and the outer plug element has a groove.

10. The drill bit according to claim 9, wherein the tongue is arranged in an axial direction between the pin elements and the drill shaft, and the groove is arranged in an axial direction at the level of the slit-shaped recesses.

11. The drill bit according to claim 10, wherein the groove is designed in a ring-shaped manner and is arranged in a plane perpendicular to the axis of rotation.

12. The drill bit according to claim 7, further comprising three or more pin elements arranged on the outer side of the inner plug element, and the outer plug element has three or more slit-shaped recesses, wherein the number of slit-shaped recesses is greater than or equal to the number of pin elements.

* * * * *